United States Patent [19]
Wynn

[11] Patent Number: 5,706,394
[45] Date of Patent: Jan. 6, 1998

[54] TELECOMMUNICATIONS SPEECH SIGNAL IMPROVEMENT BY REDUCTION OF RESIDUAL NOISE

[75] Inventor: Woodson Dale Wynn, Basking Ridge, N.J.

[73] Assignee: AT&T, Middletown, N.J.

[21] Appl. No.: 455,932

[22] Filed: May 31, 1995

Related U.S. Application Data

[63] Continuation-in-part of Ser. No. 160,770, Nov. 30, 1993, abandoned.

[51] Int. Cl.⁶ .................................................. G10L 9/00
[52] U.S. Cl. ........................ 395/2.28; 395/2.35; 395/2.42
[58] Field of Search .................................. 395/2.1, 2.09, 395/2.14, 2.15, 2.16, 2.17, 2.18, 2.2, 2.28, 2.33, 2.35, 2.36, 2.37; 381/36, 37, 38, 39, 40, 41, 46, 47, 50

[56] References Cited

U.S. PATENT DOCUMENTS

| | | | |
|---|---|---|---|
| 4,618,982 | 10/1986 | Horvath et al. | 381/36 |
| 4,628,529 | 12/1986 | Borth et al. | 381/94 |
| 5,012,518 | 4/1991 | Liu et al. | 381/42 |
| 5,295,225 | 3/1994 | Kane et al. | 395/2.35 |
| 5,319,703 | 6/1994 | Drory | 379/351 |
| 5,459,814 | 10/1995 | Gupta et al. | 395/2.42 |
| 5,533,133 | 7/1996 | Lamkin et al. | 381/94 |
| 5,544,250 | 8/1996 | Urbanski | 381/94 |

*Primary Examiner*—Benedict V. Safourek
*Assistant Examiner*—Ricky Q. Ngo
*Attorney, Agent, or Firm*—Robert B. Levy

[57] ABSTRACT

A telecommunications network service overcomes the annoying effects of transmitted noise by signal processing which filters out the noise using a model-based iterative signal estimator. The estimator is provided with a current estimate of the noise power spectral density, using signal frame samples determined by a voice activity detector to be noise-only frames. The signal estimator makes intra-frame iterations of the current frame while using smoothing across LSP parameters of adjacent frames, recent past frames, and up to two contiguous future frames. Non-stationary noise created by the iterative filtering is further reduced in one or more post-filtering stages that use knowledge of the nature of the low level non-stationary noise events.

38 Claims, 13 Drawing Sheets

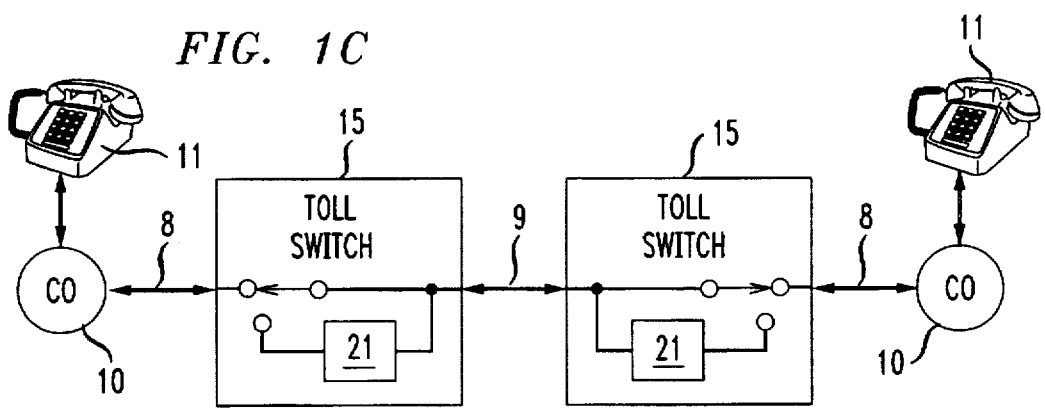
FIG. 1C
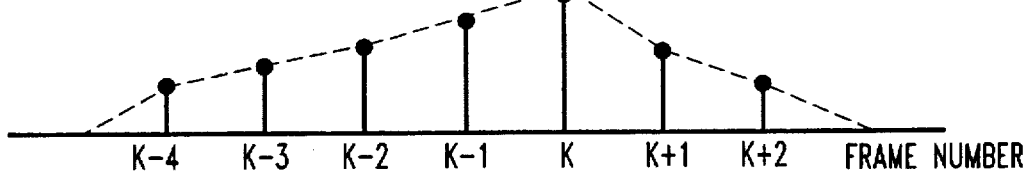
FIG. 2
SMOOTHING OF LSP ROOTS OVER SEVN FRAMES, PAST & FUTURE
FRAME WEIGHTS; SUM=1
FRAME NUMBER: K-4, K-3, K-2, K-1, K, K+1, K+2
INPUT FRAMES $y[n]=s[n]+d[n]$
FRAME HAVE 59% OVERLAPS AND ARE WINDOWED IN THE TIME DOMAIN
 K-4
 K-3
 K-2
 K-4
K — PRESENT FRAME
K+1
K+2 → TIME
FUTURE FRAMES
ITERATION 1 (1)
ITERATION 2 (2)
ITERATION 3 (3)
⋮
ITERATION j-1 (j-1)
ITERATION j (j)
FILTER-LSP SEQUENCE FOR FRAME K

FIG. 5A
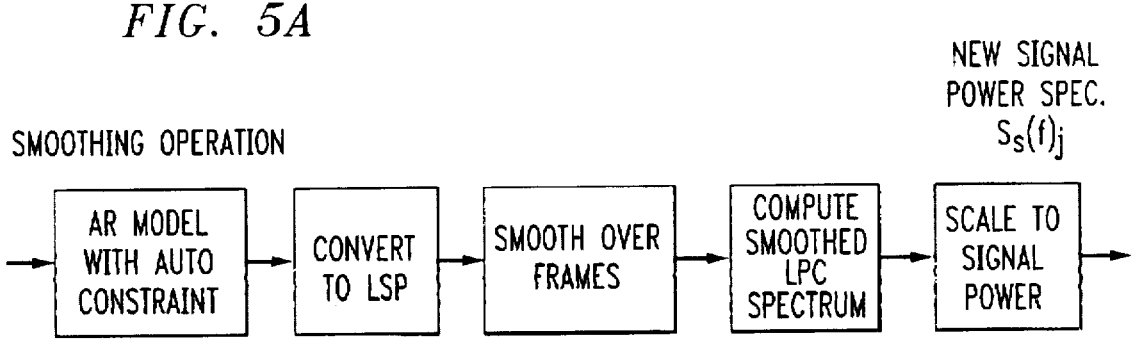
SMOOTHING OPERATION
FIG. 5B
RELAXATION OF LPC AUTOCORRELATION IN ITERATIONS
$$a_j = R_j^{-1} * b_j$$
$$\text{WHERE } R = cR_j + (1-c)R_{j-1}$$
$$\text{AND } b_j = cb_j + (1-c)b_{j-1}$$
FIG. 5C
SMOOTHING OF THE LSP ROOTS ON THE UNIT CIRCLE
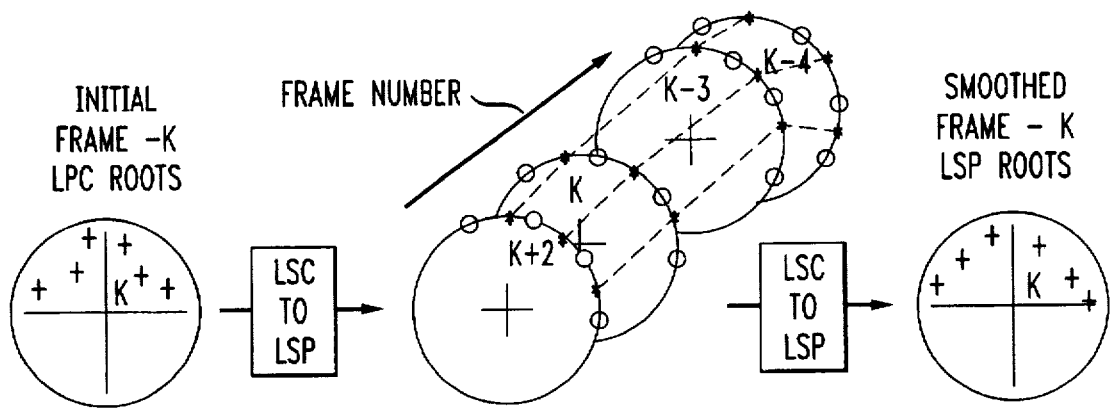

FIG. 7A

WEIGHT TABLES FOR LSP ROOT SMOOTHING PER FRAME SNR LEVEL

| WIN 0 LSP | ROOT POSITION NUMBER --> | | | | |
|---|---|---|---|---|---|
| FRAME NO. | 1 | 2 | 3 | 4 | 5 |
| K-4 | 0.0 | .1429 | .1429 | .1429 | .1429 |
| K-3 | 0.0 | .1429 | .1429 | .1429 | .1429 |
| K-2 | .15 | .1429 | .1429 | .1429 | .1429 |
| K-1 | .25 | .1429 | .1429 | .1429 | .1429 |
| K | .1429 | .1429 | .1429 | .1429 | .1429 |
| K+1 | .1429 | .1429 | .1429 | .1429 | .1429 |
| K+2 | .1429 | .1429 | .1429 | .1429 | .1429 |

| WIN 1 LSP | ROOT POSITION NUMBER --> | | | | |
|---|---|---|---|---|---|
| FRAME NO. | 1 | 2 | 3 | 4 | 5 |
| K-4 | 0.0 | 0.0 | 0.0 | .05 | .05 |
| K-3 | 0.0 | .15 | .10 | .10 | .10 |
| K-2 | .15 | .25 | .15 | .15 | .15 |
| K-1 | .25 | .50 | .20 | .20 | .20 |
| K | .50 | .10 | .30 | .25 | .25 |
| K+1 | .10 | 0.0 | .15 | .15 | .15 |
| K+2 | 0.0 | 0.0 | .10 | .10 | .10 |

| WIN 2 LSP | ROOT POSITION NUMBER --> | | | | |
|---|---|---|---|---|---|
| FRAME NO. | 1 | 2 | 3 | 4 | 5 |
| K-4 | 0.0 | 0.0 | 0.0 | .05 | .05 |
| K-3 | 0.0 | 0.0 | .10 | .10 | .10 |
| K-2 | .10 | .10 | .15 | .15 | .15 |
| K-1 | .20 | .20 | .20 | .15 | .15 |
| K | .60 | .60 | .35 | .40 | .40 |
| K+1 | .10 | .10 | .15 | .10 | .10 |
| K+2 | 0.0 | 0.0 | .05 | .05 | .05 |

| WIN 3 LSP | ROOT POSITION NUMBER --> | | | | |
|---|---|---|---|---|---|
| FRAME NO. | 1 | 2 | 3 | 4 | 5 |
| K-4 | 0.0 | 0.0 | 0.0 | 0.0 | 0.0 |
| K-3 | 0.0 | 0.0 | 0.0 | .05 | .05 |
| K-2 | .10 | .10 | .15 | .10 | .10 |
| K-1 | .20 | .20 | .25 | .25 | .25 |
| K | .60 | .60 | .50 | .50 | .50 |
| K+1 | .10 | .10 | .10 | .10 | .10 |
| K+2 | 0.0 | 0.0 | 0.0 | 0.0 | 0.0 |

FIG. 7B

WEIGHT TABLES FOR LSP ROOT SMOOTHING PER FRAME SNR LEVEL—(CONTINUATION OF FIG.7A)

| WIN 4 FRAME NO. | LSP 1 | ROOT POSITION NUMBER 2 | 3 | 4 | 5 --> |
|---|---|---|---|---|---|
| K-4 | 0.0 | 0.0 | 0.0 | 0.0 | 0.0 |
| K-3 | 0.0 | 0.0 | 0.0 | 0.0 | 0.0 |
| K-2 | 0.0 | 0.0 | .10 | .10 | .10 |
| K-1 | .20 | .20 | .20 | .20 | .20 |
| K | .70 | .70 | .60 | .60 | .60 |
| K+1 | .10 | .10 | .10 | .10 | .10 |
| K+2 | 0.0 | 0.0 | 0.0 | 0.0 | 0.0 |

| WIN 5 FRAME NO. | LSP 1 | ROOT POSITION NUMBER 2 | 3 | 4 | 5 --> |
|---|---|---|---|---|---|
| K-4 | 0.0 | 0.0 | 0.0 | 0.0 | 0.0 |
| K-3 | 0.0 | 0.0 | 0.0 | 0.0 | 0.0 |
| K-2 | 0.0 | 0.0 | 0.0 | 0.0 | 0.0 |
| K-1 | .20 | .20 | .20 | .20 | .20 |
| K | .80 | .80 | .70 | .70 | .70 |
| K+1 | 0.0 | 0.0 | .10 | .10 | .10 |
| K+2 | 0.0 | 0.0 | 0.0 | 0.0 | 0.0 |

| WIN 6 FRAME NO. | LSP 1 | ROOT POSITION NUMBER 2 | 3 | 4 | 5 --> |
|---|---|---|---|---|---|
| K-4 | 0.0 | 0.0 | 0.0 | 0.0 | 0.0 |
| K-3 | 0.0 | 0.0 | 0.0 | 0.0 | 0.0 |
| K-2 | 0.0 | 0.0 | 0.0 | 0.0 | 0.0 |
| K-1 | 0.0 | 0.0 | 0.0 | 0.0 | 0.0 |
| K | 1.0 | 1.0 | 1.0 | 1.0 | 1.0 |
| K+1 | 0.0 | 0.0 | 0.0 | 0.0 | 0.0 |
| K+2 | 0.0 | 0.0 | 0.0 | 0.0 | 0.0 |

TELECOMMUNICATIONS SPEECH SIGNAL IMPROVEMENT BY REDUCTION OF RESIDUAL NOISE

This application is a continuation-in-part of application Ser. No. 08/160770, filed Nov. 30, 1993, abandoned.

FIELD OF THE INVENTION

This invention relates to enhancing the quality of speech in a noisy telecommunications channel or network and, particularly, to apparatus which enhances the speech by removing residual noise content following an initial noise reduction operation.

BACKGROUND OF THE INVENTION

In all forms of voice communications systems, noise from a variety of causes can interfere with the user's communications. Corrupting noise can occur with speech at the input of a system, in the transmission path(s), and at the receiving end. The presence of noise is annoying or distracting to users, can adversely affect speech quality, and can reduce the performance of speech coding and speech recognition apparatus.

Speech enhancement technology is important to cellular radio telephone systems which are subjected to car noise and channel noise, to pay phones located in noisy environments, to long-distance communications over noisy radio links or other poor paths and connections, to teleconferencing systems with noise at the speech source, and air-ground communication systems where loud cockpit noise corrupts pilot speech and is both wearing and dangerous. Further, as in the case of a speech recognition system for automatic dialing, recognition accuracy can deteriorate in the noisy environment if the recognizer algorithm is based on a statistical model of clean speech.

Noise in the transmission path is particularly difficult to overcome, one reason being that the noise signal is not ascertainable from its source. Therefore, suppressing it cannot be accomplished by generating an "error" signal from a direct measurement of the noise and then cancelling out the error signal by phase inversion.

Various approaches to enhancing a noisy speech signal when the noise component is not directly observable have been attempted. A review of these techniques is found in "Enhancement and Bandwidth Compresion of Noisy Speech," by J. S. Lim and A. V. Oppenheim, *Proceedings of the IEEE*, Vol. 67, No. 12, Dec. 1979, Section V, pages 1586–1604. These include spectral subtraction of the estimated noise amplitude spectrum from the whole spectrum computed for the available noisy signal, and an iterative model-based filter proposed by Lim and Oppenheim which attempts to find the best all-pole model of the speech component given the total noisy signal and an estimate of the noise power spectrum. The model-based approach was used in "Constrained Iterative Speech Enhancement with Application to Speech Recognition," by J. H. L. Hansen and M. A. Clements, *IEEE Transactions On Signal Processing*, Vol. 39, No. 4, Apr. 1991, pages 795–805, to develop a non-real-time speech smoother, where additional constraints were imposed on the method of Lim/Oppenheim during the iterations to limit the model to maintain characteristics of speech.

The effects of the earlier methods in the Lim/Oppenheim reference are to improve the signal-to-noise ratio via the processing, but with poor speech quality improvement due to the introduction of non-stationary noise in the filtered outputs. Even very low level non-stationary noise of the type observed after filtering can be objectionable to human hearing. The advantage of smoothing across time frames in Hansen's non-real-time smoother is to further reduce the level of the non-stationary noise that remains. Hansen's smoothing approach provides considerable speech quality enhancement compared with the methods in Lim/Oppenheim, but this smoothing technique cannot be operated in real-time since it processes all data frames, past and future, at each iteration stage. Thus, the smoothing process cannot work effectively in a telecommunications environment.

SUMMARY OF THE INVENTION

The invention is a signal processing method for a communication network, which filters out noise using iterative estimation of the LPC speech model with the addition of real-time operation continuous estimation of the noise power spectrum, modification of the signal refiltered each iteration, and time constraints on the number of poles and their movements across time frames. The noise-corrupted input speech signal is applied to a special iterated linear Wiener Filter the purpose of which is to output in real-time an estimate of the speech which then is transmitted into the network.

The filter requires an estimate of the current noise power spectral density function. This is obtained from spectral estimation of the input in noise gaps that are typical in speech. The detection of these noise-only frames is accomplished by a Voice Activity Detector (VAD). When noise-only is detected in the VAD, the output is an attenuated original input so that the full noise power is not propagated onto the network. The purpose of transmitting an attenuated input in noise-only frames is to present to the receiver end a "comfort" noise.

When speech plus noise is detected in the time frame under consideration by the filter, an estimate is made as to whether the speech is voiced or unvoiced. The order of the LPC model assumed in the iterated filter is modified according to the speech type detected. As a rule, the LPC model order is set at 10 for voiced speech and 6 for unvoice speech in a time frame where the speech bandwidth is 4 KHz. This dynamic adaptation of model order is used to suppress unused model poles that can produce time-dependent modulated tonelike noise "chirps" in the filtered speech.

In accordance with another aspect of the invention, a tracking of changes in the noise spectrum is provided by updating with new noise-only frames to a degree that depends on a "distance" between the new and old noise spectrum estimates. Parameters may be set on the minimum number of contiguous new noise frames that must be detected before a new noise spectrum update is estimated and on the weight the new noise spectrum update is given.

By including a spectral subtraction step prior to the iterative filtering to create an initial signal that is noise-reduced, the overall noise reduction process can operate at lower S/N ratios.

In accordance with another aspect of the invention, some of the lower-level undesirable noise-induced false formant regions generated by the internal operation of the iterative filter are removed by adding a further step of spectral smoothing across adjacent frames. This additional step may then advantageously be followed by a process for eliminating low-level noise components from a filtered frame after this interframe smoothing step has been applied.

These and further inventive improvements to the art of using iterative estimation of a filter that incorporates an adaptive speech model and noise spectral estimation with updates to suppress noise of the type which cannot be directly measured, are hereinafter detailed in the description to follow of a specific novel embodiment of the invention used in a telecommunication network.

DESCRIPTION OF THE DRAWINGS

FIG. 1C is a diagram of a further illustrative network containing the invention;

FIG. 2 is a diagram of smoothing and iterative operations practiced in the invention;

FIGS. 5A, 5B, and 5C are diagrams depicting the interframe smoothing operation for LPC roots of the speech model; and the intraframe LPC autocorrelation matrix relaxation from iteration to iteration;

FIGS. 7A and 7B are tables of smoothing weights for the LSP position roots to smooth across seven speech frames around the current frame;

DETAILED DESCRIPTION OF AN ILLUSTRATIVE EMBODIMENT

Figure 1A:
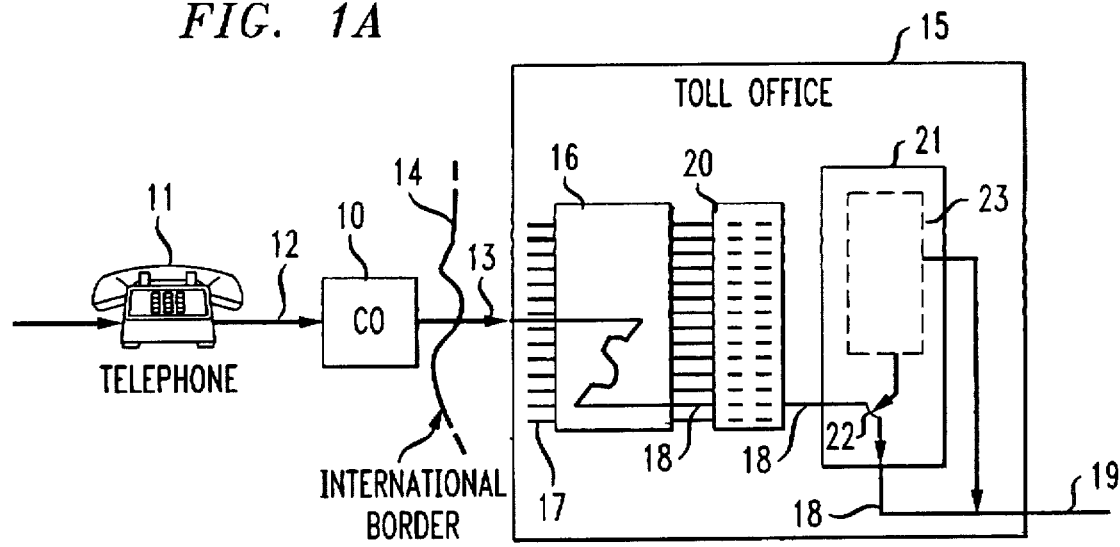
FIG. 1A is a diagram of an illustrative telecommunications network containing the invention.

The invention is essentially an enhancement process for filtering in-channel speech-plus-noise when no separate noise reference is available and which operates in real time. The invention will be described in connection with a telecommunications network, although it is understood that the principles of the invention are applicable to many situations where noise on an electronic speech transmission medium must be reduced. An exemplary telecommunications network is shown in FIG. 1A, consisting of a remotely located switch 10 to which numerous communications terminals such as telephone 11 are connected over local lines such as 12 which might be twisted pair. Outgoing channels such as path 13 emanate from remote office 10. The path 13 may cross over an international border 14. The path 13 continues to a U.S. based central office 15 with a switch 16 which might be a No. 4ESS toll switch serving numerous incoming paths denoted 17 including path 13. Alternatively, as in FIG. 1C, the communications path in which the invention is situated may comprise two toll switches 15 connected by trunks 9, each in turn connecting to local central offices 10 via trunks 8. The noise reduction circuitry of the present invention may, in this arrangement, be located as processors 21 in the toll switches 15.

Returning to FIG. 1A, switch 16 sets up an internal path such as path 18 which, in the example, links an incoming call from channel 13 to an eventual outgoing transmission channel 19, which is one of a group of outgoing channels. The incoming call from channel 13 is assumed to contain noise generated in any of the segments 10, 11, 12, 13 of the linkage. Noise is present in combination with the desired signal; but the noise source cannot be directly measured.

In accordance with the invention, a determination is made in logic unit 20 whether noise above a certain predetermined threshold is present in the switch output from channel 13. Logic unit 20 also determines whether the call is voice, by ruling out fax, modem and other possibilities. Further, logic unit 20 determines whether the originating number is a customer of the transmitted noise reduction service. If logic unit 20 makes all three determinations, the call is routed to processor unit 21 by switch 22; otherwise the call is passed directly through to channel 19. While only one processing unit 21 is shown, all of the channels such as path 18 outgoing from switch 16 are connectable to other processors 21 or to the same time-shared processor (not shown).

The incoming signal from noisy channel 13 may be pre-processed to advantage by an analog filter (not shown) which has a frequency response restricted to that of the baseband telephone signal.

In the system discussed here, the noisy speech is digitized in processor 21 at an 8 KHz rate, to create a time series of sample frames in the frequency domain. Advantageously, the frame size used is 160 samples (20 msec.) and a 50 percent overlap is imposed on these blocks to insure continuity of the reconstructed filtered speech.

Figure 1B:
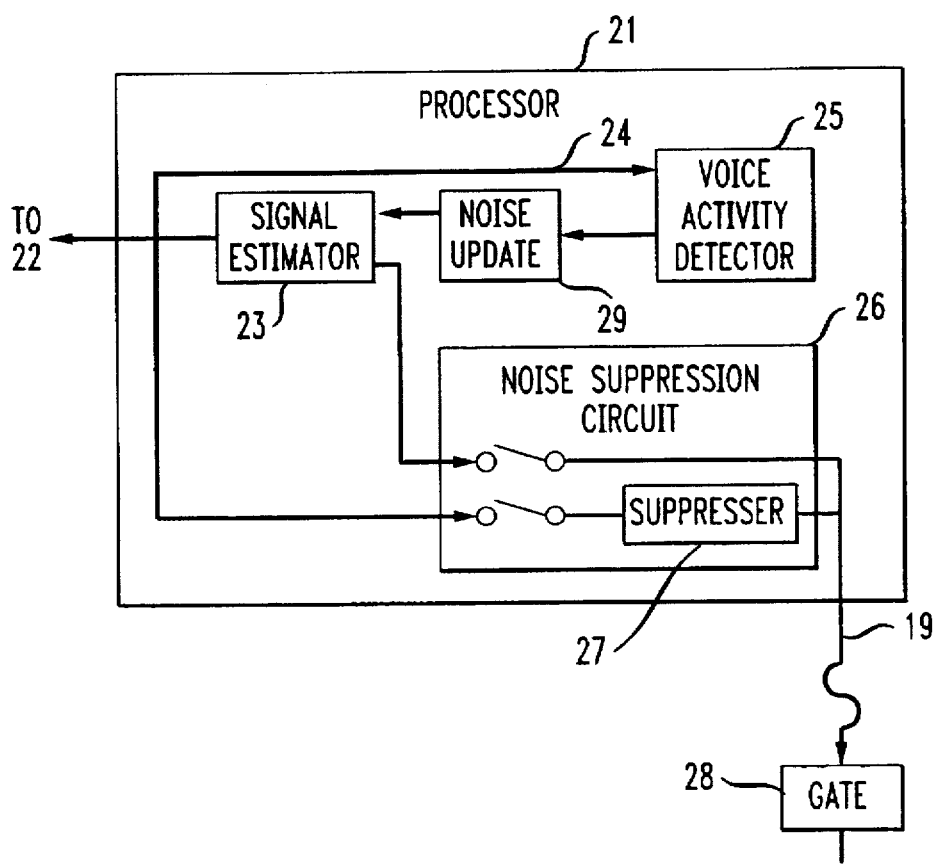
FIG. 1B is a signal processing resource.

Referring now to FIG. 1B, processor 21 comprises a model-based iterative signal estimator 23. The signal spectrum used in signal estimator 23 is determined by assuming an all-pole LPC modal and iterating each frame to estimate the unknown parameters. The purpose of signal estimator 23 is to operate on incoming speech to obtain the approximate speech content. The call also is routed via bypass 24 to Voice Activity Detector (VAD) 25, which continuously detects noise or speech-plus-noise frames and determines if a speech frame is voiced or unvoiced. The required noise spectrum to be used in the signal estimator 23 is estimated from noise-only frames detected by VAD 25.

When a processed frame is detected as noise only, the process in signal estimator 23 is not implemented; and VAD 25 signals a circuit 26 to switch in a suppressor 27 to pass attenuated original input to output channel 19. In this mode, the noise-only input to signal estimator 23 is attenuated substantially before it goes to the outgoing path 19 and to the far-end listener by gate 28. Additionally, when a noise-only frame is detected, VAD 25 signals a noise weight update function 29 associated with signal estimator 23 to make a new noise spectral estimate based on the current noise frames, and to combine this with the previous noise spectral estimate.

When speech is detected by VAD 25, input to circuit 26 is switched to signal estimator 23 such that the filtered speech is passed to the outgoing line 19. In addition, processor 21 sets the order of the LPC speech model for the signal estimator 23 at $10^{th}$ order if voiced speech is detected and at $4^{th}$ to $6^{th}$ order for an unvoiced speech frame. The motivation for this adaptive order of speech model is that the iterative search for the LPC poles can result in false formants in the frequency band where the ratio of signal power spectrum to noise power speciman is low. False formants result in noise of tonal nature with random frequency and duration in the filtered output that can be objectionable to the human ear, even though they are usually very low level relative to the average speech signal amplitude. Hence, since the LPC order typically needed for unvoiced speech is only about half that of voiced speech for the bandwidth of interest, and since unvoiced speech is usually weaker than voiced speech, it is important to modulate the LPC order such that the speech model is not over-specified for unvoiced speech frames.

The processes practiced in the filter 23 are adaptations of the available filter approach in the Lim/Oppenheim reference and on the interframe and intraffame smoothing applied by J. H. L. Hansen to improve the iterative convergence for his non-real-time AUTO-LSP Smoother discussed in the Hansen/Clements reference. Variations realized by the present invention provide heretofore unrealized real-time filter improvements in noise reduction for telecommunications. The filter operation will now be described.

SIGNAL-MODEL SMOOTHING ACROSS ADJACENT TIME FRAMES

If the speech is not already in digital form, processor 21 will routinely effect an incoming signal analog-to-digital conversion, which generates frame blocks of sampled input. Frame size of 160 samples, or 20 msec., is a time duration sufficient for speech sampled at 8 KHz rate to be approximated as a statistically stationary process for LPC modeling purposes. The iterated Wiener Filter and the LPC model of the speech process used as one component of speech estimator 23 are based on a stationary process assumption wherein the short-term speech is relatively stationary in amplitude and frequency. Hence, it is significant that the frames are processed in these short time blocks.

Referring now to FIG. 2, the input signal plus noise may be expressed by $y[n]=s[n]+d[n]$, where y is the available input sample, and s and d are the signal and noise parts. The samples are blocked into frames which overlap substantially, for example, by 50 percent. The data blocks are each weighted by a time window, such as the Hanning window, so that the sum of the overlapped windowed frames correctly spaced in time will add to give the original input time series. The use of a window reduces the variance in the LPC model estimated for a data frame, and frame overlap provides a continuity in the reconstructed filtered signal output to channel 19 in FIG. 1B.

As in the iterative AUTO-LSP smoother in the Hansen/Clements reference, there are two types of constraints for the present invention that are applied at each iteration of the signal estimator 23 during the processing of the current frame of input data. These are the LPC Autocorrelation matrix relaxation constraint applied at each intraframe iteration of the current frame, and the interframe smoothing of the current frame's LPC speech model pole positions across the LPC pole positions realized at the iteration in process for adjacent past and future frames. The LPC pole constraints are not applied directly since these occur as complex numbers in the Z-plane, and the proper association to make of the complex pole positions for interframe smoothing is not clear. An indirect approach is possible by using an equivalent representation of the LPC poles called the Line Spectral Pair (LSP), the details of which are discussed in the Hansen/Clements reference and in *Digital Speech Processing, Synthesis, and Recognition*, by S. Fururi, Marcel Dekker, Inc., New York, N.Y., 1989, Chapter V. The $N^{th}$ order LPC model pole positions are equivalently represented by a set of N/2 LSP "position" roots and N/2 LSP "difference" roots that lie on the Unit Circle in the complex Z-plane. The utility of this equivalent LSP representation of the LPC poles is that lightly damped formant locations in the signal's LPC model spectrum are highly correlated with the LSP position roots, and the bandwidths of the LPC spectrum at these formants are highly correlated with the LSP difference roots. For a stable LPC model, the two kinds of LSP roots will lie exactly on the Unit Circle and will alternate around this circle. The ordering in position of LSP roots is obvious, and their smoothing across time frames is much simpler to implement than is the smoothing of complex LPC roots. In summary, the LPC poles at each iteration of the current frame being filtered are smoothed across LPC poles at the same iteration in adjacent frames by smoothing the equivalent LSP position roots and by applying a lower bound on the minimum distance of a "difference" root to adjacent "position" root. The latter bounding restrains the sharpness of any LPC model's formants to be speech-like during the iterative search.

The invention calls for performing the LSP position smoothing across nearby contiguous time frames, but in the filter implemented for real-time application in a communication network, only a few frames ahead of the current frame being filtered can be available. For 20 msec. frames with 50 percent overlap, the minimum delay imposed by using two future frames as indicated in FIG. 2 is 30 msec. Even this small delay may be significant in some communication networks. The filter discussed here assumes four past frames and two future frames for smoothing. Although the entire past frames are available, only those correlated with the current frame should be used.

ITERATION PROCESS

Figure 3:
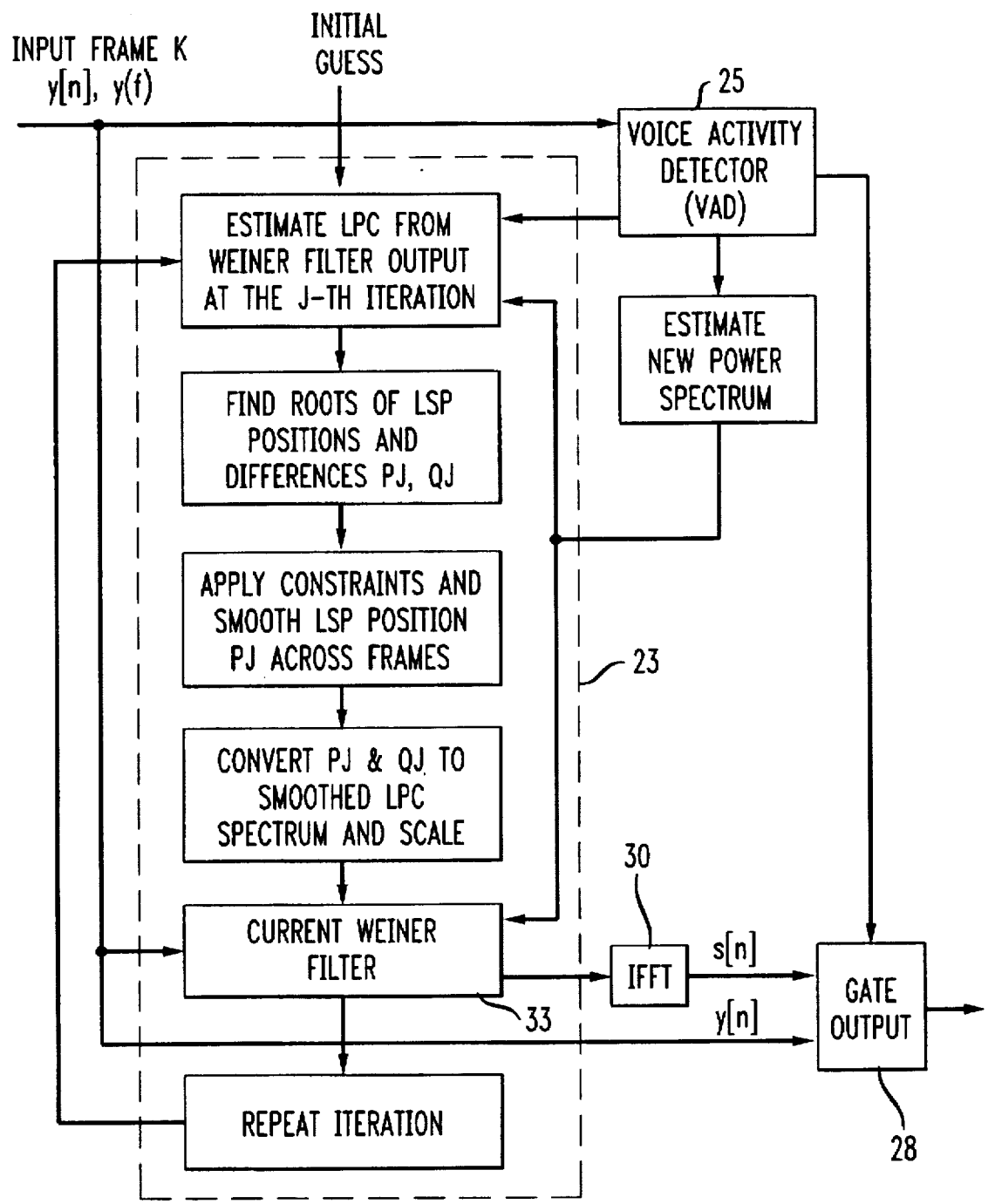
FIG. 3 is a flowchart showing the framework for speech enhancement.

The constrained iterative steps performed for the current frame K are shown in FIG. 3 with the iteration 1 . . . . . J details indicated in FIG. 4. The Wiener Filter-LSP cycle is initiated by filtering the input block y[n] in the frequency domain, by the Wiener Filter 33 (hereinafter "WF") where the signal and noise power spectral estimates used are $C \cdot S_y(f)$ and $S_d(f)$. That is, the initial WF's signal spectrum component is the total input spectrum scaled by C to have the expected signal's power $P_{signal}=P_{total}-P_{noise}$. After initialization, the loop in FIG. 3 performs the following steps for the current frame K:

(1) Start the iteration loop by estimating the LPC parameters of the WF output signal where the LPC autocorrelation calculation is subject to a relaxation over autocorrelation values of previous iterations for the frame. This relaxation step attempts to further stabilize the iterative search for the best speech LPC model. This is discussed below in conjunction with FIG. 5.

(2) From the LPC model found in (1) at iteration j for frame K, solve for the LSP position roots $P_j$ and difference roots $Q_j$. This requires the real-root solution of two polynomials each of one-half the LPC order.

(3) Smooth the LSP position roots $P_j$ for the current frame K across adjacent frames as indicated in FIG. 2 and FIG. 5C, and constrain the LSP difference roots $Q_j$ to fall a minimum distance away from the smoothed $P_j$ roots. Each difference root $Q_j$ is constrained to be more than a minimum distance $D_{min}$ away from its closest smoothed $P_j$ root. This prevents the smoothed LPC pole positions from being driven to the Unit Circle of the complex Z-plane. This "divergence" was a problem in the Lim/Oppenheim iterative filter of the Lim/Oppenheim reference that was addressed in the smoother in the Hansen/Clements reference. The constraint is desirable to iterate to a realistic speech estimate. The value $D_{min}=0.086$ radians has been used in telecommunications tests of the method.

(4) Convert the smoothed LSP roots to smoothed LPC parameters, compute the LPC signal models power spectrum $S_s(f)_j$ scaled such that the average power equals the current K_th frame estimated signal power:

$$P_{signal,K} = P_{total,K} - P_{noise,K}.$$

Figure 4:
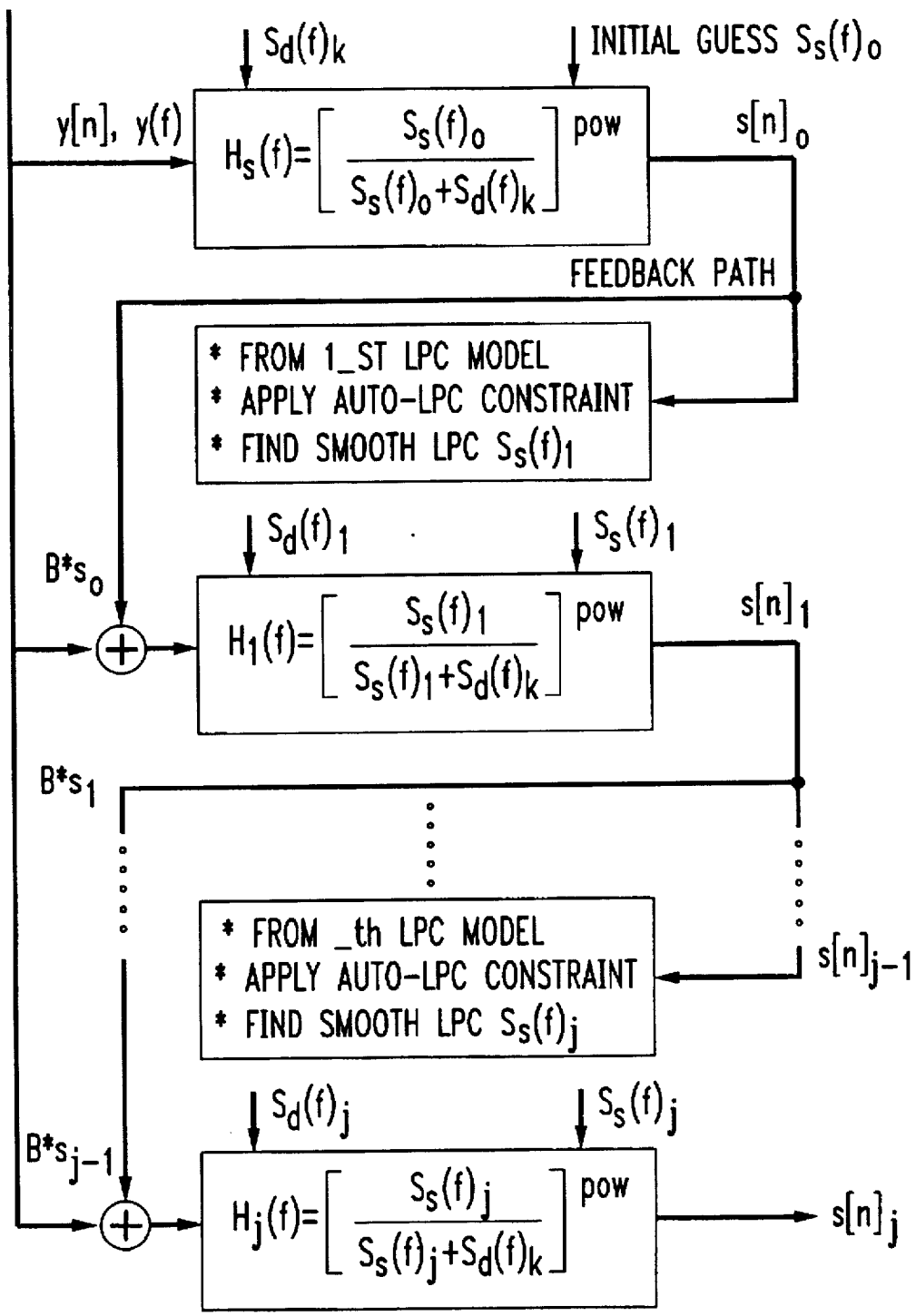
FIG. 4 is a diagram of apparatus which generates the iteration sequence for constrained speech filtering.

(5) Use the smoothed LPC model signal spectrum $S_s(f)_j$ and the current noise power spectrum estimate $S_d(f)$ to construct the next iteration's Wiener Filter $H_j(f)$ as shown in FIG. 3 and FIG. 4. The term Wiener Filter is used loosely here since this filter is the usual non-casual WF raised to a power pow, and, more generally, $S_d(f)$ may be scaled by some $\theta \neq 1$. Values for pow between 0.6 and 1.0 have been used in telecommunications tests of the method. The larger pow is, the greater the change that occurs with each iteration, but with smaller pow values the iterative search for the speech signal component should be more stable. In the applications tested, the $S_d(f)$ term in WF was not scaled, i.e., $\theta=1$ was used.

(6) As shown in FIG. 4, filter a combination of the previous iterations WF time-series output $s_{j-1}[n]$ and the original input data $y[n]$ with the current $H_j(f)$ to get the next iteration of signal estimate $s_j[n]$. The linear combination used is $(1-B) \cdot y[n] + B \cdot s_{j-1}[n]$, where $0 \leq B \leq 1$. If $B=0$, the filter operates on the initial input as in the Lim/Oppenheim iterative filter, and if $B=1$ the input to the next WF is the previous WF output as done in the Hansen AUTO-LSP smoother in Hansen/Clements reference. Values of B between 0.80 and 0.95 have been used in most of the experiments on this filter. With these values of B, some desirable features of both the Lim/Oppenheim filter and Hansen smoother were combined. This weighting concept is new in the present invention. It gives additional control of the amount of final noise content vs. the degree of high-frequency filtering observed in the iterated filtered speech.

The combining of features of the two previous signal-modeled iterative algorithms in the Lim/Oppenheim and Hansen/Clements references, specifically the weighted combination of Wiener Filter inputs each iteration, has been found subjectively to result in a less muffled sounding speech estimate, with a trade-off of slightly increased residual noise in the output. Combining is shown in FIG. 4, where it is seen that the input signal to the FILTER at the j_th iteration is the TOTAL INPUT $y[n]$ and the Wiener Filter OUTPUT $s[n]_{j-1}$ from the (j-1)_th iteration.

(7) In the present implementation of the method the number of iterations intra is an input parameter determined by experiment. For the results obtained in experiments, a value of 4 to 7 intraframe iterations were used in combinations [intra, pow] such as [7, 0.65], [5, 0.8], and [4, 1.0] where values of the feedback factor B were between 0.80 and 0.95. The best values depend on the noise class and speech type. For broad band flat noise, intra=6 may be typical; while only 4 or 5 iterations may suffice when the noise power spectrum is heavily biased below 1 KHz of the [0, 4 KHz] voice-band spectrum.

FRAME PROCESSING

Figure 6A:
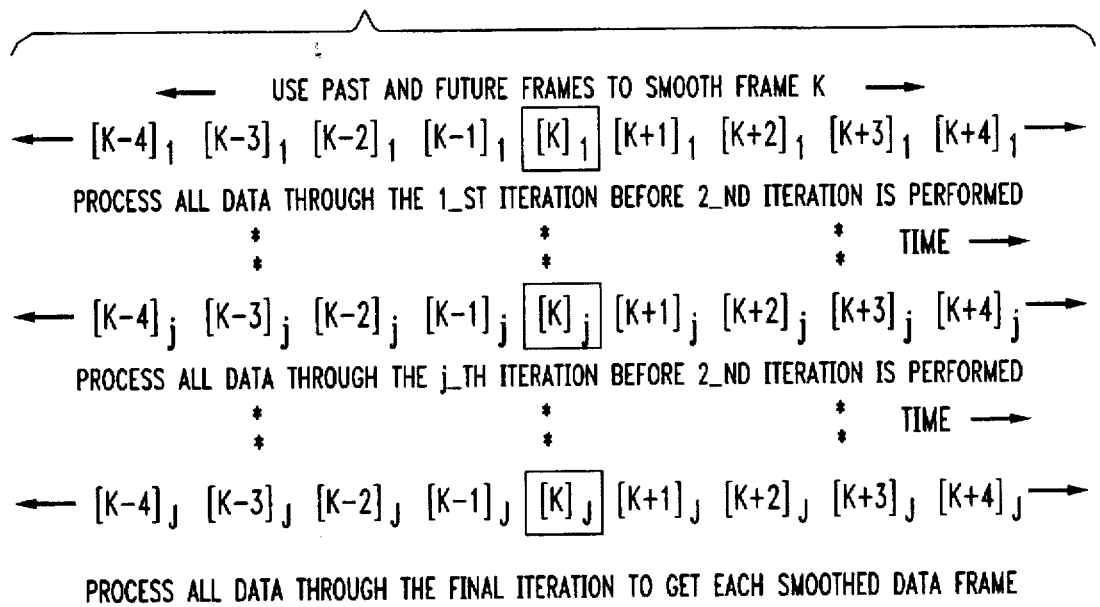
FIG. 6A is a diagram showing frames used in the prior art to update each iteration of the current frame in the non-real-time smoothing method.
Figure 6B:
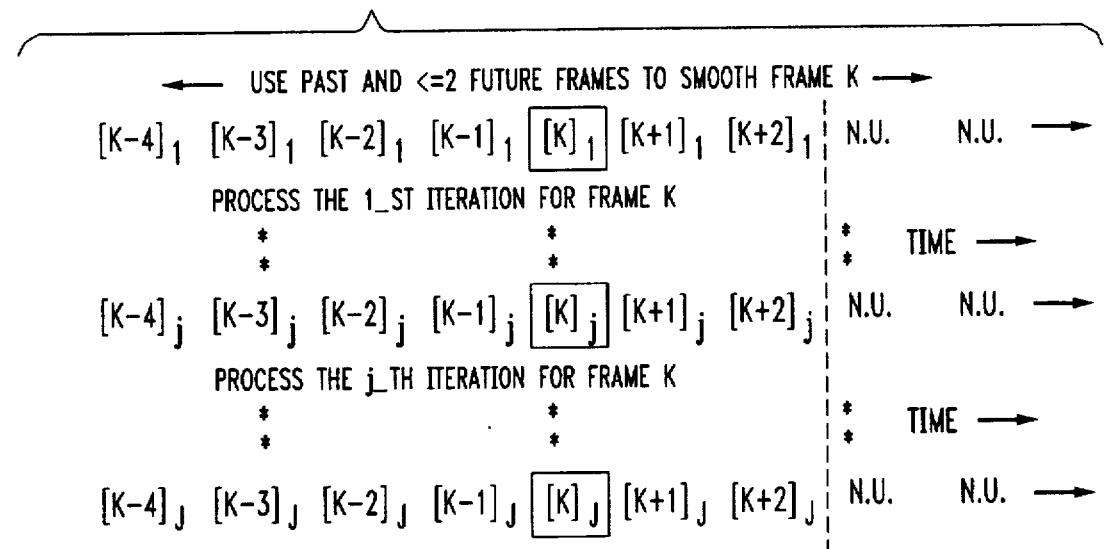
FIG. 6B is a diagram showing the improved method used for updating each iteration of the current frame.

The method of processing the frames to achieve real-time operation of filter 23 is shown in FIG. 6B. The K_th frame is assumed to be the present time reference point with frames K−4,K−3,K−2,K−1 the previously processed and archived frames while frames K+1 and K+2 are the available future frames. As in the smoothing approach in the Hansen/Clements reference, filter 23 averages the LSP room of the K_th frame speech model with those of the past and future frames at each K_th frame iteration by using the past frame LSP histories found at the iteration cycle in process. However, unlike the non-real-time smoother in Hansen/Clements reference illustrated in FIG. 6A, the present invention uses only two future frames and also stores the required past-frame LSP histories during the iterations done for each frame so that it accumulates these histories for the previous four frames to be smoothed with the current frame during each intraframe iteration. Similar to the method of Hansen/Clements reference, the weights are tapered across the frames as shown in FIG. 2 and the taper used for each LSP root depends on the current frames SNR as well as the SNR history up to this K_th frame.

Another improvement in the invention is the use of table lookup for the frame LSP weights to be applied across frames. Weight tables applied in the invention are of the type shown in FIGS. 7A–7B, whereas the weights required in Hansen/Clements reference are obtained by time-consuming formula computations which are undesirable in a real-time application. The values applied in the tables in FIGS. 7A–7B can be easily and independently adjusted, unlike the constraints imposed by the formula used in Hansen/Clements reference. The current frame SNR thresholds at which a weight vector applied to a particular LSP root number is switched from one table to another, are selected independently. The general strategy in constructing smoothing vectors is to apply more smoothing to the higher order LSP positions (i.e. higher formant frequencies) as indicated reading left to right in the tables. This is due to the greater influence of noise at given SNR observed on the higher order LSP speech positions. Another trend imposed on the table values is that smoothing is broad and uniform when the frame SNR is low and smooth domain is decreased as SNR is increased to the point where no smoothing is applied at high SNR. This trend is due to the decreasing effect of noise on the filtered speech as frame SNR is improved. The frame SNR thresholds used to switch from one table of weight vectors to another are selected as multiples of the current estimate Npow of the noise power estimated from noise-only frames detected by the VAD. The increasing thresholds used are Th1=2.Npow for change from table Win1 to Win2, Th2=3.Npow from table Win2 to Win3, Th3=7.Npow from table Win 3 to Win4, Th4=11.Npow from table Win4 to Win5, with Win0 imposed if a sufficiently long run of very low SNR frames occurs. The latter window condition is then applied to noise frame runs.

USE OF VOICE ACTIVITY DETECTION

An important aspect of the invention is the multiple application of a VAD to both detect noise-only frames from noisy speech and to determine the best model order to apply in each frame by detecting voice or unvoiced speech if speech is present. As noted before, the best order for a LPC speech model differs for voiced and unvoiced speech frames. Also, as noted earlier, the noise spectrum is updated only when no voice signal is detected in a sufficient number of contiguous frames. During a time interval when only noise is detected, suppressor 27 in circuit 26 is activated to attenuate the outgoing original signal, and signal estimator 23 is then inactive. If, however, speech is detected, then circuit 26 switches the output of 23 to the output channel 19. Further, the class of speech, voiced or unvoiced, conditions the order of the LPC speech model to be used in the signal estimator 23. Also, the detection of change between the three possible states (noise-frame, voiced-frame, and unvoiced-frame) causes the LSP history for past frames K−4, K−3, K−2, andK−1 to be reinitialized before application of smoothing to the current K__th frame. This is both necessary and logical for best speech filtering since the purpose of smoothing across past time frames is to average disparate noise by making use of the short term stationary of speech across the frames averaged.

Figure 10:
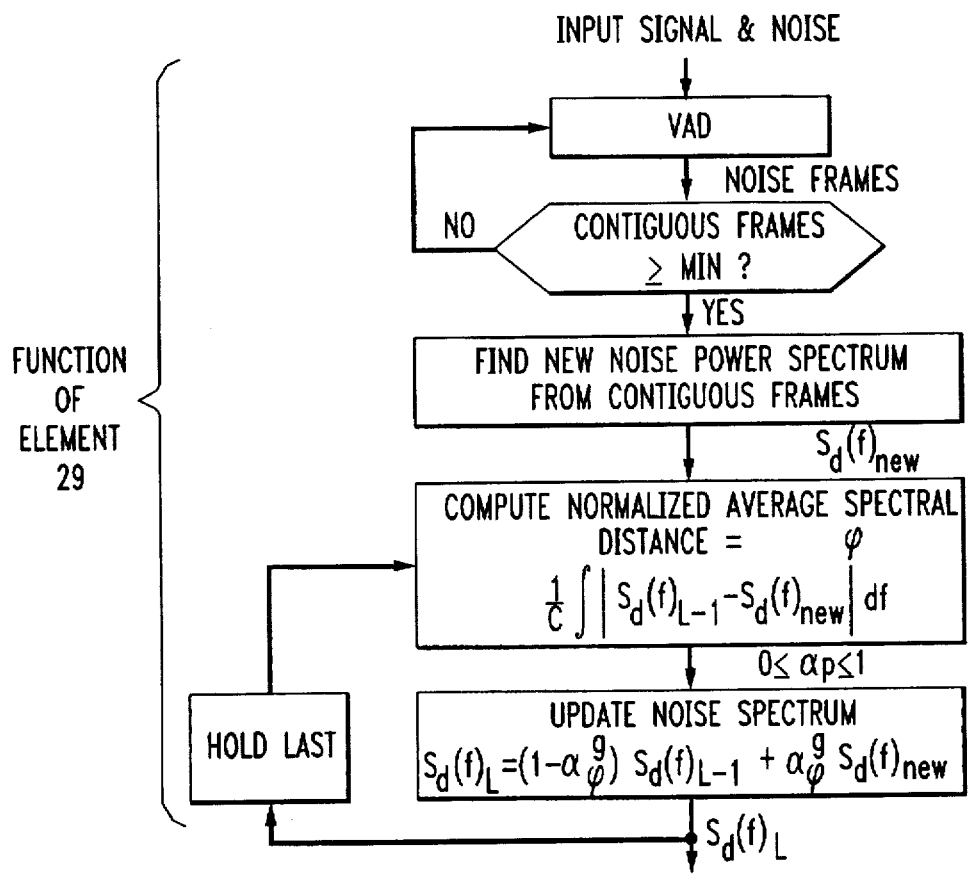
FIG. 10 is a flowchart of the steps used to update the required noise spectrum used in the iterative filter.

Estimating the noise power spectral density $S_d(f)$ from noise-only frames using a voice activity detector (VAD), in accordance with the invention, provides an advantage. The filter process outlined in FIG. 3 is based on the assumption that the noise present during speech has the same average power spectrum as the estimated $S_d(f)$. If the noise is statistically wide-sense stationary, noise estimates would not need to be updated. However, for the speech enhancement applications illustrated herein, and also for many other transmitted noise reduction applications, the noise energy is only approximately stationary. In these cases, a running estimate of $S_d(f)$ is needed. Accordingly, VAD in FIG. 1B, selected to have good immunity to noise at the operating SNR, is used to identify when speech is not present. Noise-only frames detected between speech segments are used to update the noise power spectrum estimate, as shown in FIG. 10. One suitable VAD for use in the FIG. 1B application is obtained from the GSM 06.32 VAD Standard discussed in "The Voice Activity Detector for the PAN-EUROPEAN Digital Cellular Mobile Telephone Service," by D. K. Freeman et at., in IEEE Conf. ICASSP. 1989, Section S7.6, pages 369–372.

Figure 8:
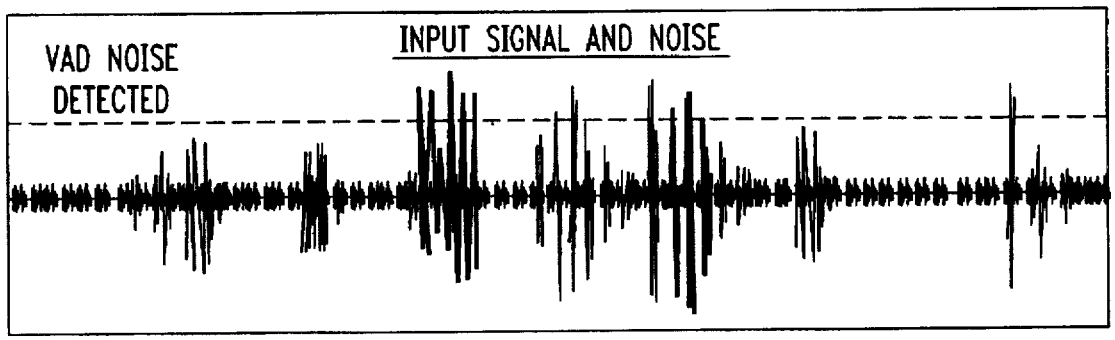
FIGS. 8 and 9 are signal traces showing aspects of the noise estimator.
Figure 9:
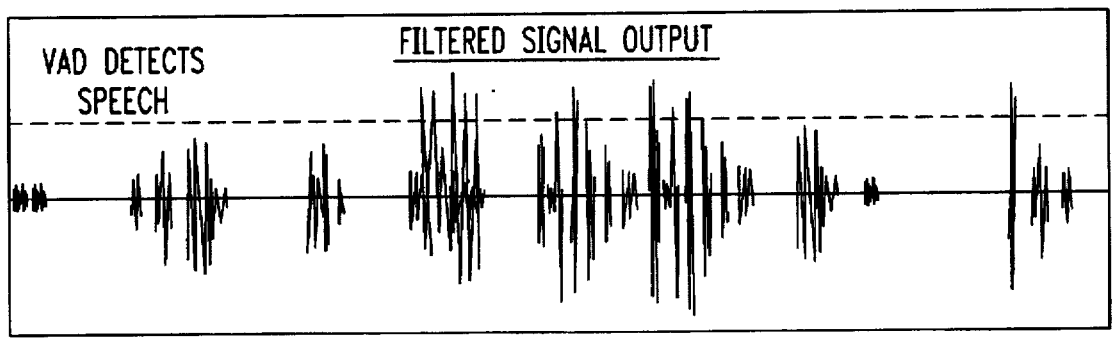

The pre-filtered and post-filtered speech examples shown in FIGS. 8 and 9 indicate how voice activity detection is used to trigger attenuation of the outgoing signal when no voice is detected. As discussed in the Freeman et at. reference, the activation of the VAD on a noise frame may be a convoluted balance of detected input level and repeated frame decisions of "no speech" properties.

IMPROVED OUTPUT USING SPEECH CLASSIFIER

Advantageously, a VAD speech classifier decision may be incorporated in the front end of the LPC model step as shown in FIG. 3. This is because the parameter settings such as LPC order in the AUTO-LSP algorithm are best adjusted according to the speech class (voiced or unvoiced) which is being filtered in the currently processed frame. If the speech within the processed frame can be classified reliably in the presence of noise, the enhancement may be improved.

NOISE SPECTRUM ESTIMATION

In accordance with another aspect of the invention, and referring to FIG. 3 and FIG. 10, an improved sensitivity to changes in the noise signal spectra is provided by apparatus which updates spectrum $S_d(f)$ with new "noise-only" frames to a degree that depends on how different the new noise spectra estimate $S_d(f)_{new}$ is from the prior estimate $S_d(f)$. If $S_d(f)_{L-1}$ denotes the prior noise spectrum, the updated spectrum is $$S_d(f)_L = (1-A) \cdot S_d(f)_{L-1} + A \cdot S_d(f)_{new}$$

where $0 \leq A \leq 1$ is a normalized average of the error $|S_d(f)_{L-1} - S_d(f)_{new}|^p$ over the frequency band. Typical values for p are 1→2. When a new noise spectrum estimate is near the prior estimate shape, A is near 0; but when the two spectral shapes are very different, A will be nearer 1 and the new noise frames will be heavily weighted in $S_d(f)_L$. Noise-frame decisions are made by the VAD which is a relatively conservative estimator in the proper SNR range; hence the probability of correct noise decisions is high for SNR above 10 dB. The time between noise updates is not a parameter in this approach, only average spectral difference. In order to decrease the variance in estimating the spectrum $S_d(f)_{new}$ it is desirable to require a number of contiguous noise-frame decisions from the VAD before and update is valid. In tests of the enhancement, 5 or 6 contiguous noise-frames were required before an update of the spectrum is allowed.

ADDITIONAL COMMENTS ON THE AUTO-LSP IMPROVED ITERATIVE FILTER

As discussed previously, two types of constraints are used in the AUTO-LSP filter approach to improve the Lim/Oppenheim model-based iterative filter. These are the intraframe autocorrelation relaxation placed on the autocorrelation matrix which is computed for the LPC model each iteration; and the interframe smoothing over LSP roots that occurred in the iteration for the time frames around the frame being filtered. The constraint operations, performed each iteration, are shown in in FIGS. 5A, 5B, 5C. The smoothing operation shows the order in which the constraints are to be applied during an iteration to obtain that iteration's Wiener Filter (WF) signal power estimate $S_s(f)_j$ from the previous iteration signal result $s[n]_{j-1}$. The iterative sequence of filtering the whole Signal+Noise y[n] with the WF where at each iteration the new estimate of the signal spectrum is inserted into the WF model will, in theory, converge to the best signal estimate under the statistical assumptions imposed in the Lim/Oppenheim reference. In the real-world speech telecommunications signal and noise classes of interest, the additional AUTO-LSP intraframe and interframe constraints assist the convergence and impose speech-like requirements on the signal spectrum in the WF. The intraframe autocorrelation relaxation is shown in of FIG. 5B, where the desired LPC model parameters are denoted as a, the autocorrelation matrix of the latest signal estimate $s[n]_j$ is $R_j$, and $b_j$ is the cross-correlation vector in the Yule-Walker AR method. A preferred relaxation factor is c=0.7. The relaxation can be expanded to smooth over more than just the previous frame, but no significant advantage has been observed in doing this. The smoothing process is shown in FIG. 5C. Each large circle indicates the Unit Circle in the complex Z-plane. For the K__th frame and iteration j, the symbol 'o' marks the LSP difference roots $Q_{Kj}$ and '*' marks the position roots $P_{Kj}$. For a LPC model that is minimum phase, the LSP poles lie inside the Unit Circle and the $P_{Kj}$ and $Q_{Kj}$ will alternate along the unit circle. LSP smoothing is over the past and future frames, where the present set is K−4, K−3, K−2, K−1, K, K+1, K+2. Only the position roots $P_{Kj}$ are smoothed directly, and the difference roots $Q_{Kj}$ are forced to track the smoothed $P_{Kj}$ with a minimum constraint. An inverse step gives the smoothed, scaled LPC signal model's spectrum $S_s(f)_j$. The complex roots of an equivalent LSP representation are simply the solution of a pair of real-root polynomials each with half the order of the original LPC polynomial, as is fully described in the Hansen/Clements and Furui references.

A clear computational advantage exists in smoothing LSP roots in the AUTO-LSP approach rather than directly smoothing the complex domain roots of the LPC autoregressive models. Even though the LPC and LSP model representations are equivalent, a possible disadvantage of smoothing LSP roots across frames is that a nonlinear relationship exists between the LPC spectrum formant locations/bandwidths and the corresponding LSP position/ distance roots. Specifically, as LPC roots move away from the Unit Circle, LSP position roots do not identify well with the LPC formant frequencies or bandwidths. However, this nonlinear mapping does not seem to limit the effectiveness of constrained LSP roots in providing improved speech enhancement in the signal estimator 23.

The described process is particularly effective when the noise is statistically wide-sense stationary during the time interval from the point of estimation of the noise power spectrum to the end of the speech+noise processed using this noise estimate. It seems to be most effective for signal-to-noise ratios above 10 dB SNR. For interference cases such as automobile road noise and aircraft cockpit noise, where much of the spectral energy is at the lower part of the audio band, it may function usefully down to 5 dB SNR. For stationary tone-like noise such as in-network hum, the filter has been operated with considerable success for SNRs below 0 dB when the VAD can provide a clear indication of the noise-only frames.

The processes performed by processor 21 of FIG. 1B and as flow-charted in FIGS. 3 and 4 and illustrated elsewhere herein, may all be run in real time on a single digital signal processor such as the DSP 21020 produced by Analog Devices, Inc. The signal estimator 23, noise update component 29, VAD 25 and noise suppression circuit 26 with suppressor 27 may all be implemented in the noted digital signal processor or similar devices. Persons skilled in the art of digital signal processor applications development will be able to write applications software for the DSP 21020 using a high-level programming language, preferably "C" code. If a sub-routine is not fast enough when written in "C," the assembly language of the specific DSP may be used.

The preceding exemplary embodiment of the invention illustrates a real-time noise-reduction scheme using a definitive LPC voice model with iterative filtering. In this design as described in FIGS. 3 and 4, real time performance is achieved through iterating the current frame by using only a relatively few overlapping neighboring frames, for example, seven contiguous frames in which there are only two "future frames," four "past frames" and the "present" frame denoted "K." This process performs the iterations with respect to the current frame "K," and estimates the power spectrum of the noise, using noise-only frames detected in the VAD 25.

The linear predictive coding-based filter described herein as signal estimator 23, however, is not unique among numerous LPC-based filters or even simple spectral subtraction devices in its tendency to generate during the noise-reduction operation low-level non-stationary noise components. The noise-reducing circuits exhibit the tendency to create low-level noise energy which manifests itself as annoying warbling or chirping sounds on the network.

The original noise input to the noise-reduction device such as filter 23 may be relatively stationary in amplitude and frequency over time, whereas the residual internally-created noise components while much reduced in average power level by the filtering vary markedly and randomly from frame to frame in amplitude and/or frequency, even disappearing altogether only to occur in a frame down the line.

In the specific case of signal estimator 23, filtering may break down during iterations if the input signal-to-noise ratio is too low in some domain of the frequency band. There is in effect a threshold of signal-to-noise ratio below which the iterative filtering process will internally generate an excessive amount of the above-noted low level non-stationary noise components. This phenomenon can be made more pronounced as the number of iterations used to filter each frame K is increased.

The reduction of these residual noise components can be achieved by additional signal processing applied at selected points of a noise-reduction process such as is operated in processor 21. The additional signal processings are: partial noise-spectral subtraction (for convenience, referred to hereinafter as "stage 1"), applied at the process input; interframe-spectra smoothing applied at the process output (hereinafter "stage 2"); and finally intra-frame spectral smoothing applied to a frame at the process output from stage 2 (hereinafter "stage 3"); Each of these additional stages utilizes different signal processing techniques specifically targeted at improving different characteristics of the filter. In particular, stage 2 and stage 3 are used to reduce the residual noise energy. The three additional stages about to be described, improve upon the generalized noise-reduction apparatus singly or in any combination.

SPECTRAL SUBTRACTION TO REDUCE RESIDUAL NOISE (Stage 1)

Figure 15:
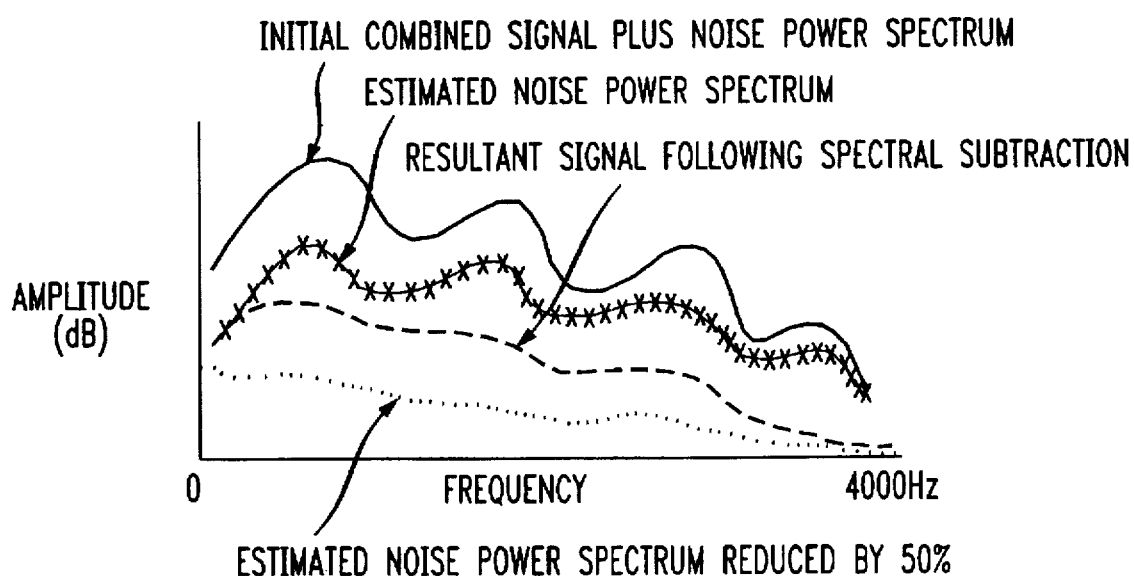
FIG. 15 is a frequency/amplitude graph illustrating the spectral subtraction process pre-filtering step in FIG. 11.

The spectral subtraction stage operates to subtract a portion of the estimated noise power spectrum from the initial combined signal plus noise power spectrum as illustrated in FIG. 15. Spectral subtraction occurs before any iterative filtering operations. Various specific methods of noise reduction by spectral subtraction are described in J. R. Deller, et. at., "Discrete-Time Processing of Speech Signals," Macmillan, New York, 1993, at Section 8.3, which is hereby incorporated by reference. One such spectral method, eigen-decomposition, is a viable candidate for a real-time telecommunications network application. Another, the Fourier transform spectral method, is preferred for use in real-time telecommunications noise reduction because of its realistic cost advantages in implementation when compared to the eigen-decomposition method.

The spectral subtraction pre-filter step has been found most advantageously if applied to assisting the iteration process at low S/N ratios. Subtraction of as much as 50 percent of the noise power spectrum floor, for example, may be desirable; whereas subtraction of appreciably more than that percentage of the noise floor risks loosing some of the inherent noise-reducing capability of the model-based iteration process. As more and more of the noise floor is subtracted in the prefilter, chirp noise is introduced initially and is increasingly created during convergence operations applied by the iterative filter. Accordingly, the determining of an optimal spectral subtracting level during operation is important.

Figure 11:
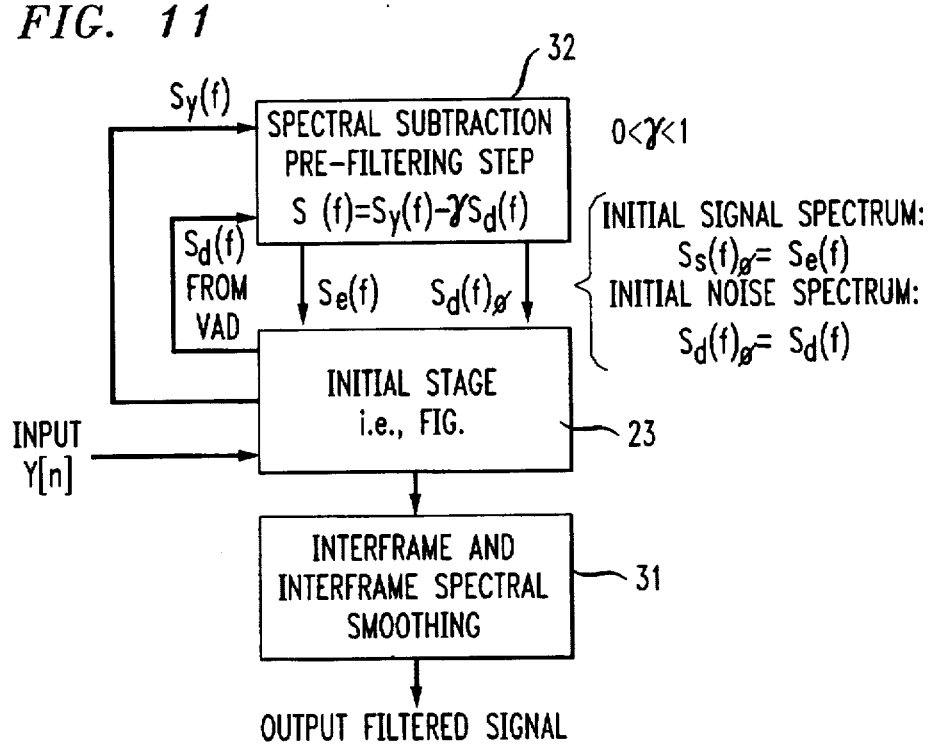
FIG. 11 is a high-level block diagram of the basic process of the invention further enhanced by a special subtraction step prior to the filtering, and interframe and intraframe smoothing steps included after the initial stage of filtering.
Figure 12:
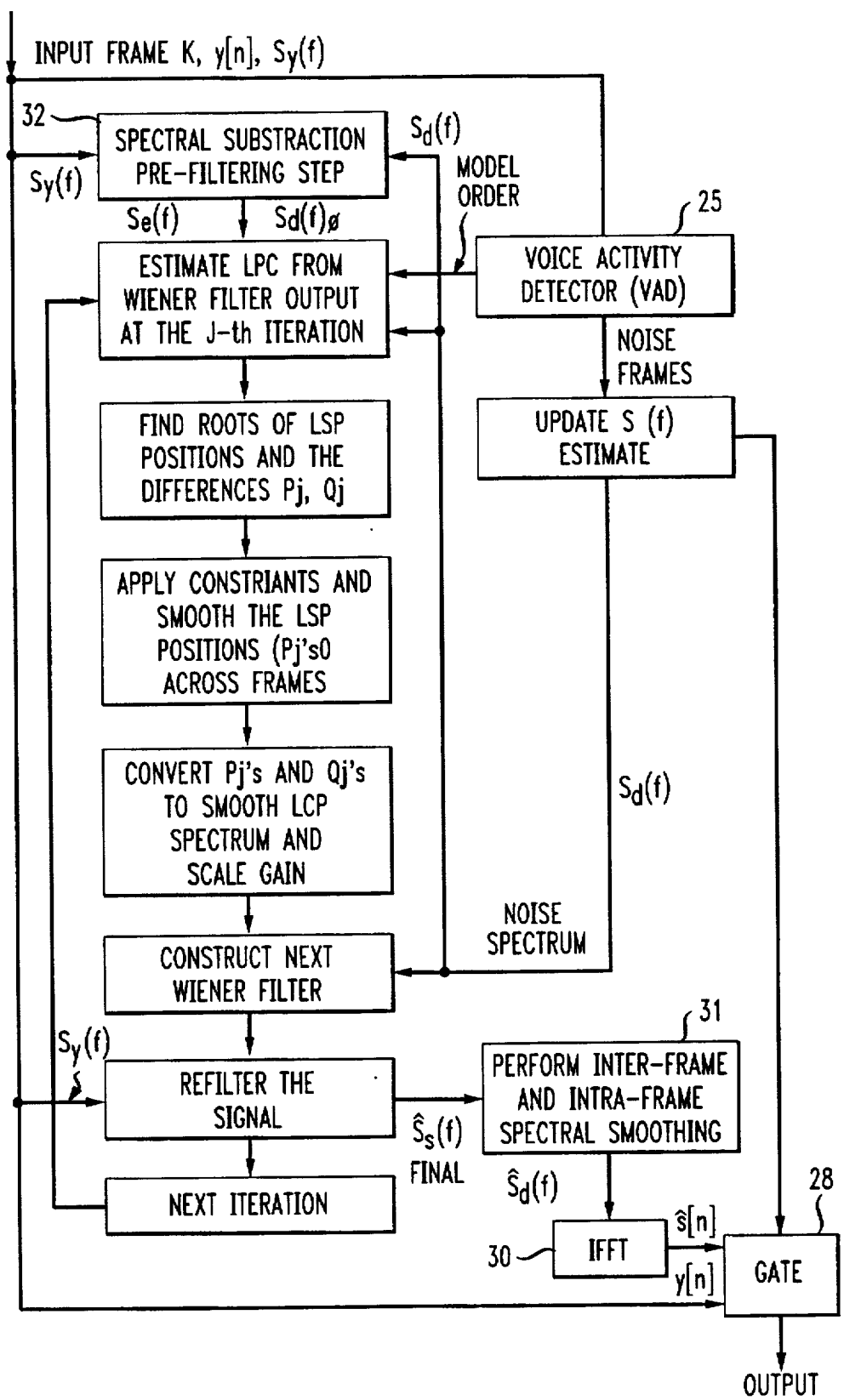
FIG. 12 is a flow chart showing the combined processing stages and sequences of FIGS. 4 and 11.

FIGS. 11 and 12 describe the addition of the spectral subtraction step to the overall noise reduction process of FIG. 3. Spectral subtraction can be implemented in a DSP processor as well. FIG. 11 shows the signal estimator 23, the functions of which are described in the FIG. 3 flowchart, the input frame K denoted y[n] and a filtered signal output. This signal is provided either to a gate output 28 in FIG. 3, or may be supplied to inter-frame and intra-frame spectral smoothing element 31 which provides post filter stages 2 and 3 (to be described hereinafter), of which the output is fed to gate 28 in FIG. 3. Spectral subtraction is performed in spectral subtraction element 32. Two inputs to element 32 are extracted from filter 23: $S_y(f)$, and $S_d(f)$ both obtained from VAD 25. The outputs from element 32 to the input of filter 23 are an initial signal spectrum $S_e(f)_0 = S_e(f)$ and an initial noise spectrum $S_d(f)_0 = S_d(f)$. The term $\gamma$ is a scaling factor which allows for adjustment of the level of noise spectrum subtracted from the input $S_y(f)$ to generate the pre-iteration initial guess signal $S_e(f)$.

As in the basic process described above, the input waveform is digitized and the digit stream is segmented into overlapping blocks of past, future and current frames of a standard length appropriate for speech, for example, 20 ms. The "initial guess" $S_e(f)_o$ in FIG. 4. FIG. 11 and FIG. 12 of the basic process is replaced by $S_e(f)$ at the initial iterative filter step. Thus, the initial guess becomes: $S_e(f) = S_y(f) \gamma S_d(f)$ instead of the raw input spectrum $C \cdot S_y(f)$ as was used in the basic process.

Signal processing then proceeds as illustrated in the sequential steps set forth in the more detailed FIG. 12, in substantially the same operations as in the basic process: an estimate of LPC coefficients is made in the signal estimator 23, the LSP root positions and differences are computed, constraints and smoothing of the LSP positions are made across past and future frames; then the process converts the terms $P_j$ and $Q_j$ to smooth LPC spectrum, and scale gain, and the next Wiener Filter 33 in the iterative sequence is constructed. The VAD 25 as in the basic process detects noise-only frames; enables/disables the signal estimator 23 output, sets the LPC order to be used, and outputs initial spectral signals $S_y(f)$ and $S_d(f)$.

INTER-FRAME SMOOTHING (Stage 2)

Figure 13:
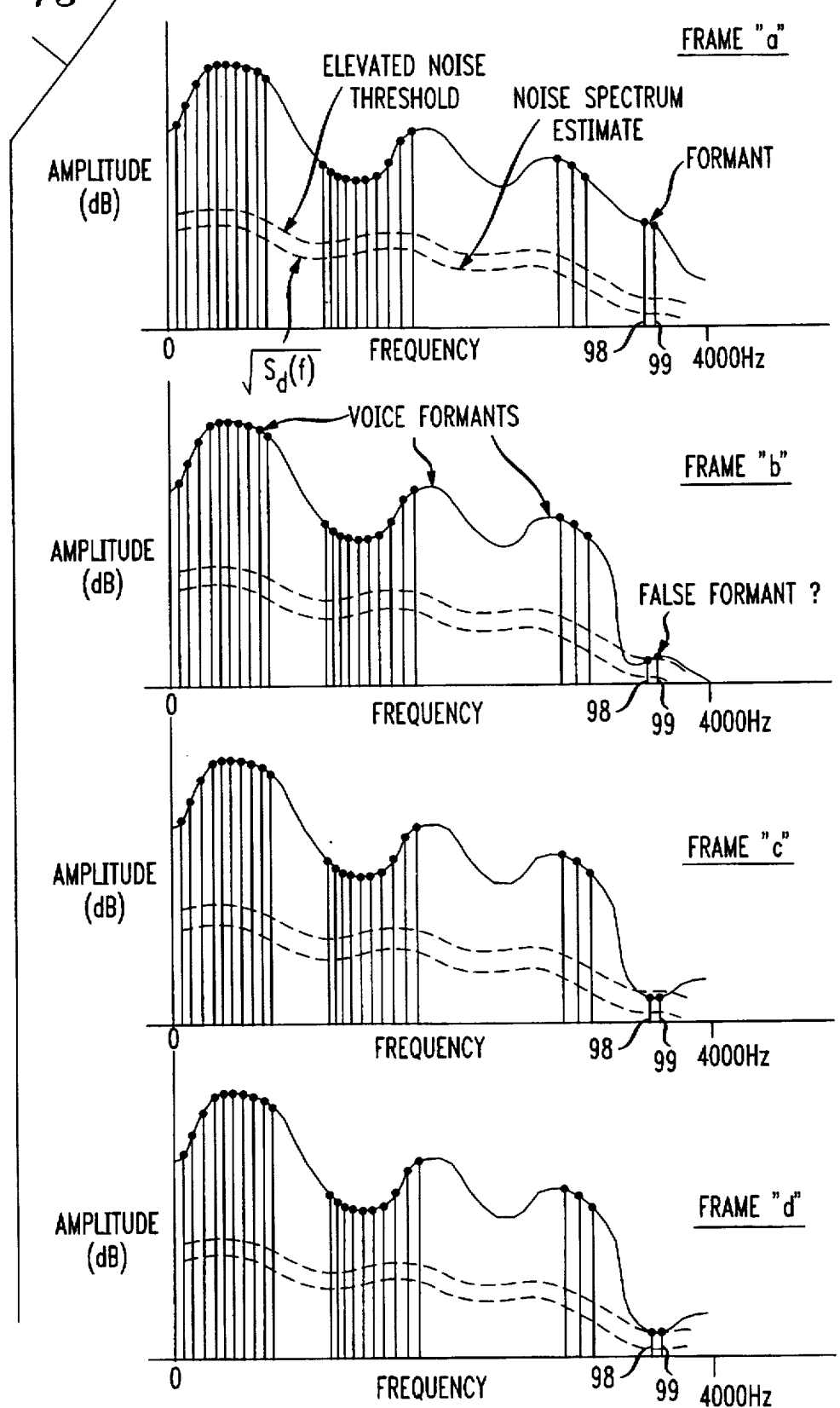
FIG. 13 is a frequency/spectral amplitude diagram of four successive frames illustrating the interframe smoothing to remove false formant pickets created by low level internally generated noise from the initial stage of filtering.

FIG. 13 illustrates power spectra of four exemplary data frames which are time-sequential as frames (a) through (d). Each is the end output of the basic noise reduction process already described with possibly the additional stage 1 pre-filtering step with respect to FIGS. 3 and 4. The frames, denoted "a," "b," "c," "d," each consist of, for example, 128 unique Fourier Transform pickets from a 256-point FFT. The frame pickets represent the estimated speech power spectrum $S_e(f)$ of the voice signal after iterative filtering. The noise spectrum estimate for each frame and generated in accordance with the earlier-described processes is shown as the long-dash line in each of the frames.

The envelope peaks formed by the highest amplitude picket clusters are, in accordance with the above-noted principles, deemed to be voice formant terms which are the dominant spectral regions for speech signals. Due to the model order chosen for the LPC representations in the preceding processes and other causes, however, low level envelope peaks sometimes are created from frame to frame which look like components of speech formant pickets but are not. Typically, these false formant terms occur when the spectral S/N ratio is low in a domain of the voice band.

The following additional smoothing steps when added to the overall processes help to suppress chirp-causing pickets of false formants that are noise-based. They are implemented in smoother 31 of FIGS. 11 and 12.

Referring again to FIG. 13, a noise threshold trace elevated above the noise spectral estimate is generated, which at each frequency, for example, is one noise spectrum standard deviation above the noise spectrum estimate for the frame. This degree of offset from the noise floor was selected based on subjective evaluations in trials of the process; but other distances above the noise spectrum estimate may be used. The frames, as in the initial process, are 20 msec. frames with 50 percent overlay. At a sampling rate of 8000 per second each 160 sample frame is zero-filled to 256 points and a 256 point real FFT yields 128 unique spectral pickets in each frame.

The current frame such as frame "b" in FIG. 13 undergoes a scan of all 128 pickets to determine if any have amplitudes which fall on or below the elevated estimated noise threshold. If none do, signifying that the probability is relatively high that all of the pickets are voice signal and not noise, then all pickets of the current frame are retained as output.

For all pickets in the current frame "b" which do fall on or below the elevated estimated noise threshold applied to that frame, a smoothing operation is applied. A measurement is made in smoother 31 of the amplitude at the same picket positions in the next-adjacent time frames. Next, a comparison is made of the amplitudes of the three like-numbered pickets in the three contiguous frames to determine the minimum amplitude picket level. This minimum amplitude then is substituted for the original value of the picket in the current frame "b" which was found to be on or below the elevated threshold. This operation can result in an amplitude reduction of a picket of residual noise from the iterative filtering process.

The preceding steps are exemplified in FIG. 13 by the reference to the picket position numbered 98 in the frames "a–d." Again, assume that frame "b" is the current frame. A scan of frame "b" shows that picket 98 is on or below the elevated noise threshold. Accordingly, smoothing function 31 makes a comparison of the picket amplitudes at the corresponding picket position 98 in the next-adjacent time frames, namely frames "a" and "c," to determine which of the three pickets is minimum amplitude. From the comparison of the amplitudes of picket 98 as occurring in frames "a, b, c" it is seen that the picket with least amplitude is the one in position 98 of frame "c." Its value therefore is substituted for the value of picket 98 in frame "b" in constructing a smoothed frame for output. Examination of picket 99 also shows it is on or below the noise threshold for position 99 and that the level for frame "c" is the least across the three frames "a," "b," and "c." Then "c" picket 99 level is substituted for picket 99 of "b" in constructing the smoothed frame for output in the "b" frame timeslot.

After the comparisons and adjustments have been made for all the pickets in the current frame "b," a smoothed frame is the output in the "b" timeslot and the process shifts to frame "c" as the next current frame. The same scan process is made to identify pickets in frame "c" which fall on or below the current elevated noise reference threshold; and for those that do, the comparisons are made across the amplitudes of the corresponding picket positions in frames "b," "c," and "d." However, in the picket amplitude comparison it is the initial values of the pickets in frame "b" which are used in the comparison, and not the smoothed picket values that may have been used to create the previous smoothed frame for output in "b"'s timeslot.

Identifying probable noise induced formants in the frequency spectrum of an iteratively filtered data frame by use of thresholds, as described above, may be extended to further improve noise removal in accordance with another aspect of the invention. The human ear's sensitivity is non-uniform across the voice band; and in particular spectral regions the ear is more affected by non-stationary chirping noise residuals in the basic iterative filter output. For example, the band [300 Hz, 1200 Hz] to many humans is more sensitive than is [0, 300 Hz] or [1200 Hz, 4000 Hz]. For a discussion of the ear's sensitivity, see *Advances in Speech Signal Processing*, Sondhi, M. M. and Furui, S., editors, Marcel Dekker, Inc., New York, 1992, ISBN 0-8247-8540-1, chapters 4, 14 (sec 4.4), and 15. In accordance with this further aspect of the invention, the threshold trace in FIG. 13 may be increased in the region [300 Hz, 1200 Hz] without affecting the remainder of the frequency band. This attempts to reduce more of the chirping noise albeit at the expense of increased smoothing of real speech's low-level formants. The particular delta offset of this frequency-dependent threshold from the noise spectrum estimate for the improved filter that best accommodates the ear, advantageously is quantified by experiments taking into account the particular language transmitted and other factors.

INTRA-FRAME SMOOTHING (Stage 3)

A further expedient in eliminating low-level chirp-noise components from a filtered frame is to scan the spectral pickets in each frame that results from stage 2 smoothing. Here the objective is to look for any low level picket that is less than a prescribed threshold but which is relatively large compared to a particular pair of neighboring pickets in the same frame. The following further processing illustrates the principle, and may be implemented in a DSP processor along with all other functions.

Figure 14:
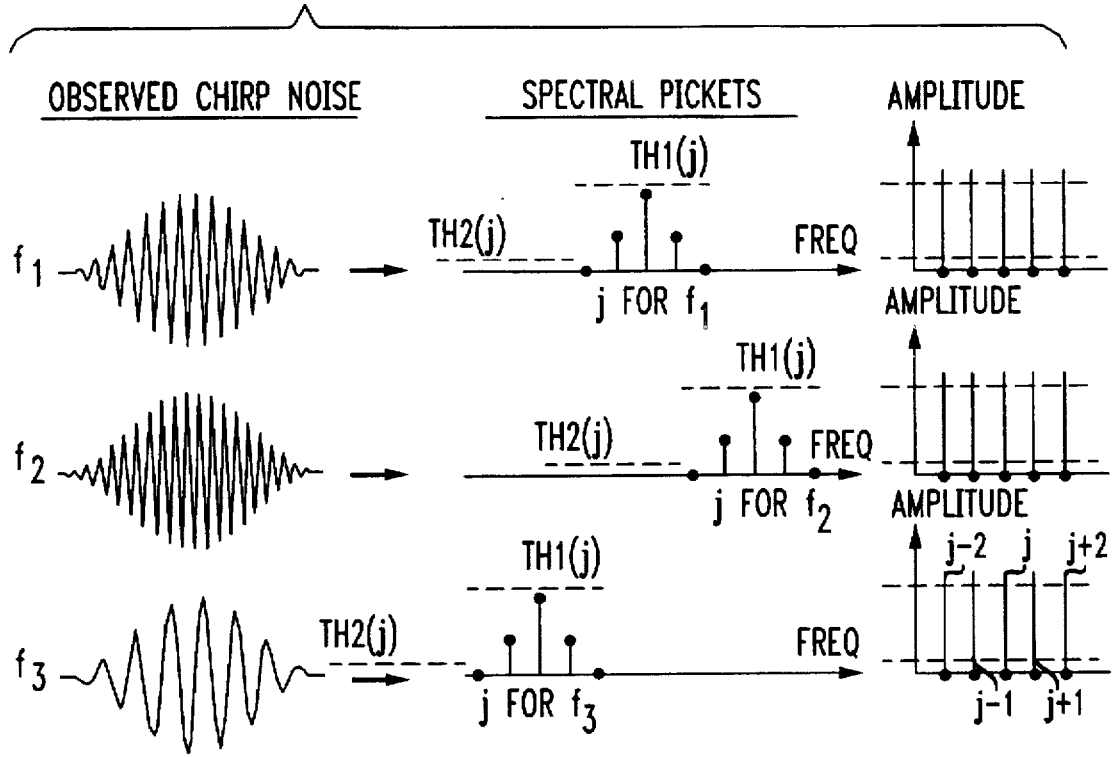
FIG. 14 is a frequency/amplitude picket diagram illustrating the removal of chirp sounds using intra-frame information from a filtered signal.

In FIG. 14, the current frame smoothed spectrum is shown for three separate illustrative current frames with the threshold TH1($j$) vs. picket frequency j again set at a recommended one noise-standard-deviation above the current noise spectrum estimate $\sqrt{S(j)}$. Three windowed noise waveforms, each windowing a different window frequency designed f1, f2, f3, cause spectral pickets as shown. The picket amplitudes may vary in each frame; and the pickets may populate different frequency regions.

Consider now a current frame resulting from the stage 2 smoothing. If that frame has a picket "j" whose amplitude is less than a first prescribed threshold TH1($j$) while the amplitudes at nearby pickets "j–2" and "j+2" are lower than a second prescribed threshold TH2($j$), then the amplitudes of the "j–1," "j" and "j+1" pickets are replaced by the average of the picket amplitudes at frequency positions "j–2" and "j+2." This replacement logic is applied across all pickets in the current frame.

The logic of this approach is that the chirp noises observed at the output of the signal estimator 23 in the practice of the basic invention are often like windowed random tone with low-level spectral amplitudes, compared with those of the dominant speech formants. Also, since the signal estimator 23 is based on processing overlapping data blocks each of which are Hanning windowed in the time domain, the spectrum of a chirp will be aliased in frequency such that the picket of a tone at position "j" may be highly correlated with the levels at picket positions "j–1" and "j+1;" but much less correlated with pickets at "j–2" and "j+2." However, for speech spectra, more continuity across the picket levels is expected. In particular across the frequency domain of only three pickets, the levels at positions "j–2" and "j+2" for speech would not usually be expected to be as much as 15 dB lower than that of a low-level picket "j." An example of this type of interframe spectral smoothing is shown in FIG. 14 on the right-hand side.

Like TH1($f$), the relative position of the second threshold TH2($f$) is also determined experimentally. For the picket "j," a threshold TH2($j$) at 15 dB below the level at "j" is indicated. In order to prevent error runs in this application, the frame picket levels obtained from the interframe smoothing output of stage 2 are used in the test for each picket "j" and not any of the replacement pickets levels which result in stage 3 smoothing as the present picket amplitude adjustments are applied across the current spectrum.

After all iterative filtering and post-smoothing is applied, the resulting current filtered frame is inverse transformed in the IFFT function 30 and passed to output gate 28 for reconstruction as continuous time series filtered speech. The gate 28 will pass filtered speech if the VAD 25 indicates that speech is present. But when noise only is indicated by the VAD 25, an attenuated level of $y_n$ is passed to provide pleasant noise at the output as FIG. 1B indicates. The recommended level of pleasant noise is 10 to 20 percent of the input $y_n$ for noise-only frames, but the best percentage is based on subjective tests with the language filtered and the noise type present.

The invention claimed is:

1. In a telecommunications network carrying incoming signals having both speech and noise energy, a method including iterative estimations using an LPC speech model for processing said signals at a selected point in said network to reduce said noise energy, comprising the steps of:

converting said incoming signals to a time-series of spectral energy data frames;

reducing in an initial stage comprising said LPC speech model the noise energy in each frame, thereby creating noise-reduced data frames having residual low- amplitude non-stationary noise appearing randomly in data frames as false formant pickets or other noise components of varying amplitudes;

selecting pickets in each said data frame which in accordance with a first criterion are likely to represent false formant pickets;

minimizing the variation in amplitudes of said selected pickets with the pickets in corresponding positions in adjacent said data frames, thereby creating noise-minimized frames; and combining said noise-minimized frames with said noise-reduced frames and transmitting the combined signal through said network.

2. The method of claim 1, comprising the further step of:

minimizing the within-frame variations in amplitude of further said pickets identified in accordance with a second predetermined criterion as likely to represent said other noise components.

3. The method of claims 1 or 2, comprising the further steps of:

making an estimate of the noise power spectrum for each said data frame; and spectrally subtracting from said convened signal prior to its entering said initial stage a predetermined fraction of said noise power spectrum estimate.

4. In a telecommunications network carrying incoming signals having both speech and noise energy, a method including iterative estimations using an LPC speech model for processing said signals at a selected point in said network to reduce said noise energy, comprising the steps of:

17 converting said incoming signals to a time-series of spectral energy data frames;

reducing in an initial stage comprising said LPC speech model the noise energy in each said frame, thereby creating noise-reduced data frames having residual low-amplitude non-stationary noise appearing randomly in data frames as false formant pickets or other noise components of varying amplitudes;

making an estimate of the noise power spectrum for each said data frame;

identifying in successive said data frames any said pickets at or below a threshold amplitude set at a defined distance above said noise power spectrum estimate for each said data frame.

comparing the amplitude of each identified picket in a given data frame to the amplitudes of corresponding said pickets in time-adjacent data frames to determine which has the minimum amplitude; combining said noise-minimized frames with said noise-reduced frames; and substituting said minimum value for the amplitude of each said identified picket; and transmitting the combined signal through said network.

5. The method of claim 4, wherein said successive time-adjacent frames are the frames immediately adjacent to said given frame.

6. The method of claim 5, wherein said defined distance according to claim 4 is not substantially greater than one power spectrum standard deviation above said noise power spectrum estimate established for each said frame.

7. The method of claims 4, 5, or 6, comprising the further steps of identifying in successive ones of said data frames one or more spectral pickets having amplitudes within a range which according to a predetermined criterion are likely to represent non-stationary noise energy;

comparing within the same frame the amplitude of each said identified spectral picket with the amplitudes of nearby pickets of different frequency values to determine if any of said nearby pickets have amplitudes falling below said range, and if any are found;

adjusting downward the amplitude of each identified said picket; and transmitting the frames with said downward-adjusted picket amplitudes through said network.

8. The method of claim 7, wherein said nearby pickets are the pair located two picket positions on either side of said identified picket.

9. The method of claim 8, wherein said downward adjustment step comprises:

averaging the values of said pair of pickets; and substituting the result for the amplitude values of said identified picket and of the pickets next-adjacent to said identified picket.

10. The method of claims 4, 5, or 6 comprising the further steps of spectrally subtracting from said converted signal a predetermined fraction of said noise power spectrum estimate; and applying the resultant said spectrally reduced signal to said initial stage.

11. The method of claim 10, wherein said noise power spectrum estimate is generated in said initial stage.

12. The method of claim 10, wherein said predetermined fraction is in a range of up to 50 percent of said noise power spectrum estimate.

18

13. The method of claim 9, comprising the further steps of:

spectrally subtracting from said converted signal a predetermined fraction of said noise power spectrum estimate; and applying the resultant said spectrally reduced signal to said initial stage.

14. The method of claim 13, wherein said noise power spectrum estimate is generated in said first stage.

15. The method of claim 14, wherein said predetermined fraction is in a range of up to 50 percent of said noise power spectrum estimate.

16. The method of claim 3, wherein said selected point in said network is a toll switch.

17. The method of claim 7, wherein said selected point in said network is a toll switch.

18. The method of claim 10, wherein said selected point in said network is a toll switch.

19. The method of claim 15, wherein said selected point in said network is a toll switch.

20. In a telecommunications network carrying incoming signals having both speech and noise energy, a method for processing said signals at a selected point in said network to reduce said noise energy, comprising the steps of:

converting said incoming signals to a time-series of special energy data frames;

using an iterated filter based on an LPC speech modal with filter-order adjustments, iteratively processing said data frames to create a new filter for each iteration of a current frame, a noise power spectra estimate for each frame and a noise-reduced output speech signal for each iteration, thereby also creating residual low-amplitude non-stationary noise appearing randomly in data frame pickets at false formant or other noise components;

detecting noise-only frames and in response thereto updating said noise power spectrum estimate only during said noise-only frames;

identifying in successive said data frames from the output speech signal of said iterative filter any said pickets at or below a threshold amplitude set at a defined distance above said noise power spectrum estimate for each said data frame;

comparing the amplitude of each identified picket in a given data frame to the amplitudes of corresponding said pickets in time-adjacent data frames to determine which has the minimum amplitude;

substituting said minimum value for the amplitude of each said identified picket;

combining said noise-minimized frames with said noise-reduced frames; and transmitting the combined signal through said network.

21. The method of claim 20, comprising the further step of:

attenuating said incoming signal in further response to said detection of noise-only frames; and passing said attenuated incoming signal to said network.

22. The method of claim 21, comprising the further step of:

identifying in successive said data frames any said pickets at or below a threshold amplitude set at a defined distance above said noise power spectrum estimate for each said data frame;

comparing the amplitude of each identified picket in a given data frame to the amplitude of corresponding said pickets in time-adjacent data frames to determine which has the minimum amplitude;

substituting said minimum value for the amplitude of each said identified picket to further minimize noise components therein;

combining said noise-minimized frames with said noise-reduced frames; and transmitting the combined signal to said network.

23. The method of claim 22, comprising the further step of:

detecting voiced speech and in response thereto adjusting said LPC modal filter order to substantially the $10^{th}$ order.

24. The method of claim 23, comprising the further step of detecting unvoiced speech and in response thereto adjusting the LPC modal filter order to a range of from $4^{th}$ to $6^{th}$ order.

25. The method of claim 24, wherein said successive time-adjacent frames are the frames immediately adjacent to said given frame.

26. The method of claim 25, wherein said iterative filter operations further comprise:

selecting from said time-series of data frames a short sequence of consecutive frames including the current frame;

iterating the current frame over only said frame sequence; and performing iterations numbering from three to seven on said current frame, thereby to create a smoothed estimate of the speech power spectrum for said frame.

27. The method of claim 26, wherein said iterative processing further comprises creating a new Wiener Filter for each iteration of a current frame by combining the output of the previous Wiener Filter iteration with the unfiltered said incoming signal in a preselected weighting ratio, thereby to control through said weighting the final noise content of said output signal vs. the degree of high-frequency filtering in said iterative filtering.

28. The method of claim 27, wherein said short sequence of frames includes from 1 to 2 future frames and from 1 to 4 past frames.

29. The method of claim 28, wherein said data frames during said iterations are overlapped.

30. The method of claims 20, 21, 22, 23, 24, 25, 26, 27, 28, or 29, wherein said defined distance according to claim 20 is not substantially greater than one power spectrum standard deviation above said noise power spectrum estimate for each said frame.

31. The method of claim 30, comprising the further steps of:

identifying in successive ones of said data frames one or more spectral pickets having amplitudes within a range which according to a predetermined criterion are likely to represent non-stationary noise energy;

comparing within the same frame the amplitude of each said identified spectral picket with the amplitudes of nearby pickets of different frequency values to determine if any of said nearby pickets have amplitudes falling below said range; and if any are found, adjusting downward the amplitude of each identified said picket; and transmitting the frames with downward-adjusted picket amplitudes through said network.

32. The method of claim 31, wherein said nearby pickets are the pair located two picket positions on either said of said identified picket.

33. The method of claim 32, wherein said downward adjustment step comprises:

averaging the values of said pair of pickets; and substituting said average for the amplitude values of said identified picket and of the next-adjacent to said identified picket.

34. The method of claims 20, 21, 22, 23, 24, 25, 26, 27, 28, or 29, comprising the further steps of:

spectrally subtracting from said converted signal a predetermined fraction of said noise power spectrum estimate; and applying the resultant said spectrally reduced signal to said iterative filter step.

35. The method of claim 34, wherein said predetermined fraction is in a range of up to 50 percent of said noise power spectrum estimate.

36. The method of claim 35, wherein said data frames substantially overlap one another by substantially 50 percent.

37. The method of claims 20, 21, 22, 23, 24, 25, 26, 27, 28, or 29, wherein said selected point in said network is a toll switch.

38. The method of claim 30, wherein said selected point in said network is a toll switch.

* * * * *